March 26, 1935.  F. J. PLYM  1,995,397
FREEWHEELING VEHICLE
Filed June 20, 1932   2 Sheets-Sheet 1
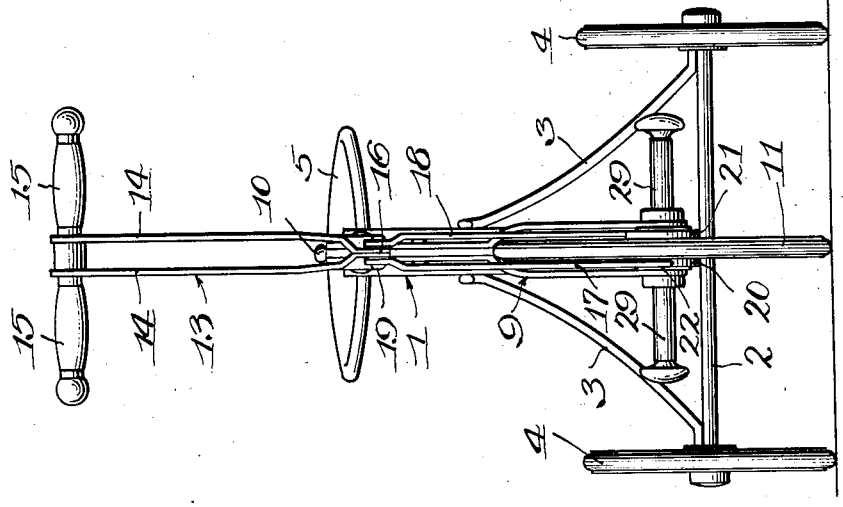
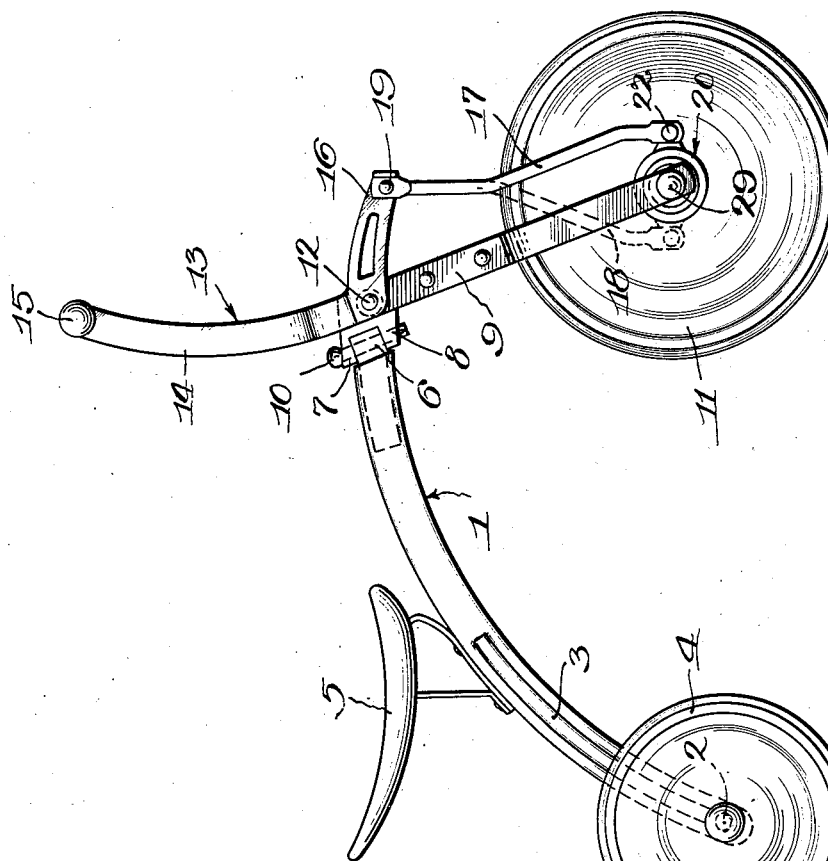
Witness:
Chas. R. Koursh
Inventor,
Francis J. Plym,
Wallace R. Lane Atty.

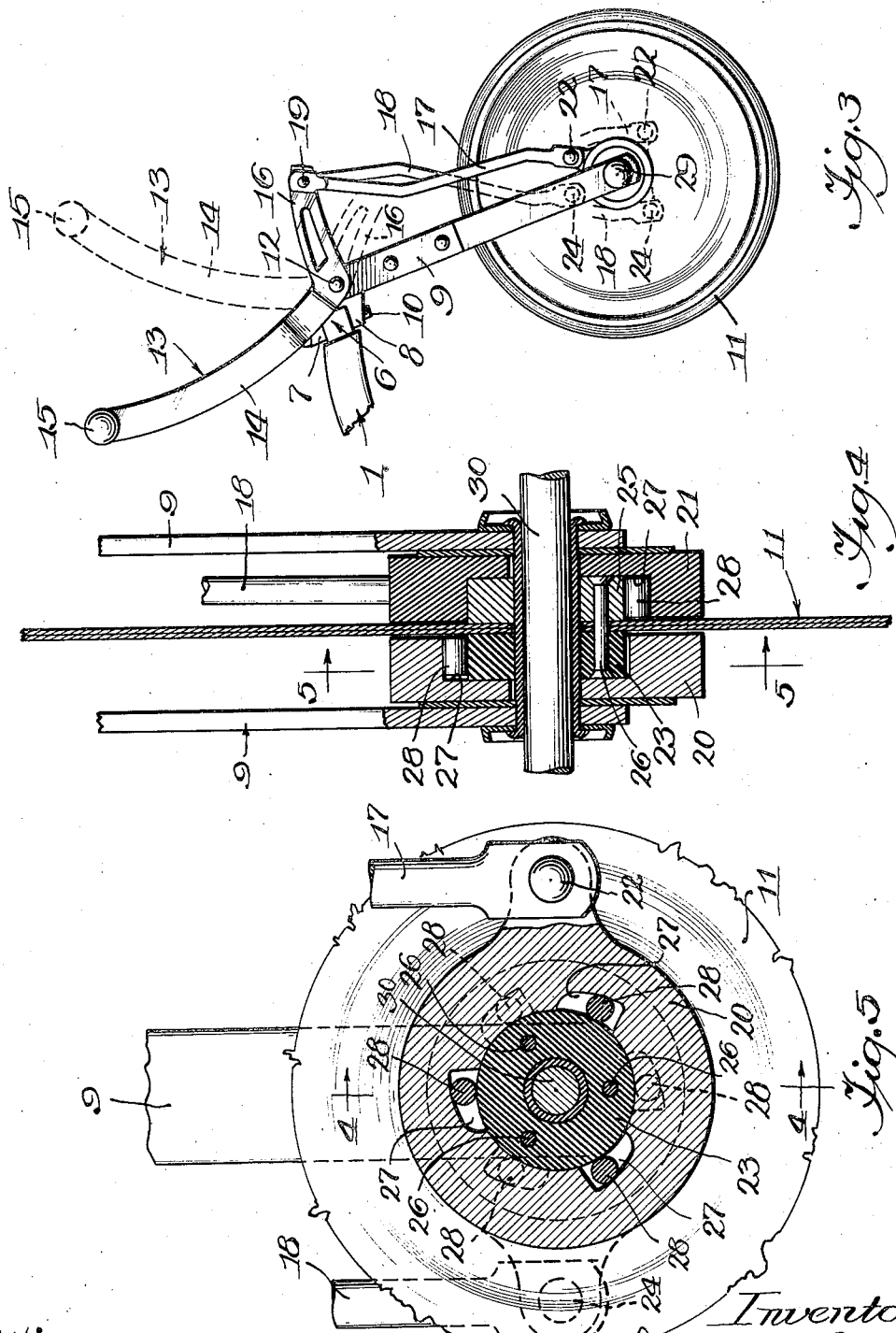

Patented Mar. 26, 1935

1,995,397

UNITED STATES PATENT OFFICE 1,995,397

FREE-WHEELING VEHICLE

Francis J. Plym, Niles, Mich., assignor to The Kawneer Company, Niles, Mich., a corporation of Michigan Application June 20, 1932, Serial No. 618,125

7 Claims. (Cl. 208—35)

The present invention relates to vehicles, and more in particular to a novel construction of a free-wheeling vehicle adapted for use by small children, in which the vehicle is propelled by operation of the handle.

Among the objects of the present invention is to provide a novel means and mechanism for propelling small vehicles such as tricycles or the like, upon which the child may be seated and propel the vehicle by hand power. Substantially all of the various and numerous vehicles for children's use that are now on the market, such as bicycles, tricycles, scooters, velocipedes and the like, the motive power for propelling the vehicle is imparted thereto by movement of the feet. In the present device, the child need not employ his feet in the operation thereof, but such operation and guiding is accomplished solely by the child moving or operating the handle.

Another object of the invention is the provision of a novel free-wheeling mechanism for driving or operating the vehicle in a forward direction. When the child does not transmit motion to the handle, the mechanism is such as to permit the vehicle to continue to move under its own momentum.

A further object of the invention is the provision of a novel clutch arrangement for propelling the vehicle in a forward direction, and which permits free wheeling of the vehicle when it is not being manually propelled. Thus when the child is coasting so that the vehicle continues to move under its own momentum, or when the vehicle is being pulled or pushed, the clutch arrangement will automatically adjust itself to neutral position so that there is no drag or braking of the vehicle during such movement.

A still further object of the invention is the double-clutch arrangement adapted to be hand-operated for propelling a vehicle. In the present embodiment, the vehicle is propelled by both a forward and backward movement of the handle, so that a positive propulsion is imparted to the vehicle during the reciprocation of the handle.

Still another object of the invention is the provision of a novel handle structure for operating the clutches for driving the vehicle. In the present embodiment, this handle structure includes spaced levers or operating arms, one on each side of the front wheel which in the present instance is the driving member.

Further objects are to provide a construction of maximum simplicity, efficiency, economy, and ease of assembly and operation, and such further objects, advantages and capabilities as will later more fully appear and are inherently possessed thereby.

The invention further resides in the combination, construction and arrangements of parts illustrated in the accompanying drawings, and while there is shown therein a preferred embodiment, it is to be understood that the same is susceptible of modification and change, and comprehends other arrangements and details, without departing from the spirit of the invention.

In the drawings:

Fig. 1 is a view in side elevation of the novel vehicle construction.

Fig. 2 is a view in front elevation of the vehicle.

Fig. 3 is a view in side elevation of the front wheel and propelling mechanism.

Fig. 4 is a fragmentary view in vertical cross section taken through the front wheel and clutch arrangement.

Fig. 5 is a fragmentary view in vertical cross section through the clutch construction and taken in a plane represented by the line 5—5 of Fig. 4.

Referring more particularly to the disclosure in the drawings, the numeral 1 refers to the frame construction which is mounted upon the rear axle 2 and provided with brace members 3, also mounted on the rear axle. Wheels 4 are mounted at the opposite ends of the axle 2, while a seat 5 is mounted on the frame 1.

The forward end of the frame 1 is provided with a coupling member 6 adapted to be received intermediate spaced parts 7 and 8, rigidly connected to the upper end of the fork 9. A pin 10 passes through openings in the members 7 and 8 so as to provide a pivotal hinge arrangement for turning of the fork 9 and wheel 11.

Pivotally mounted at 12 upon the fork is a substantially L-shaped handle 13 comprising spaced bars 14. At the upper end of the handle is provided a pair of handle bars 15 adapted to be grasped by the operator for propelling and guiding the vehicle. The forward end 16 of the handle is adapted to be received intermediate spaced operating arms or levers 17 and 18 extending on opposite sides of the wheel 11. These operating arms are pivotally connected at 19 to the handle and at their opposite ends are connected to clutch members 20 and 21. The front driving lever or operating arm 17 is pivotally connected at 22 to the clutch member 20 which encompasses and is rotatable upon a section 23 of the drum, the latter being connected to the wheel 11. The rear driving lever or operating arm 18 is pivotally connected at 24 to the clutch member 21 which likewise encompasses a section 25 of the drum, the sections 23 and 25 going to make up the drum construction being connected to the wheel 11, as by means of a rivet, pin or the like 26.

Each of the clutch members 20 and 21 is provided on its inner periphery with a plurality of wedge-shaped slots 27 in each of which is loosely positioned a roller 28 adapted to be wedged intermediate the clutch members and the drum whereby the clutch members transmit their power to the drum which in turn rotates the wheel 11. Thus as each of the clutch members is rotated in a clockwise direction, they will cause the rollers 28 to be wedged in the tapered end of the slots 27 so as to clutch the drum. When the clutch members are operated in a reverse or counter-clockwise direction, the rollers 28 will be disengaged from the drum.

By the present construction, when the handle 13 is being brought forwardly by the operator, the clutch member 20 through its connection with the driving lever or operating arm 17 is rotated in a clockwise direction whereby to engage the drum and rotate the wheel forwardly. At the same time, the rear driving lever or operating arm 18 is rotating its clutch member 21 in a counter-clockwise direction whereby the rollers 28 in this clutch member are disengaged from the drum and the clutch member rotates relative to the drum. When the handle is pulled backwards by the operator, the reverse operation takes place in that the clutch member 20 is being returned and is rotated relatively to the drum, while the clutch member 21 is clutched to the drum and rotates the same in a clockwise direction. Thus, there is positive propulsion whenever the handle 13 is being operated or reciprocated, either in a forward or backward direction.

When the handle is not being operated or the vehicle is being pulled or pushed, the rollers in both clutch members will automatically find a neutral position so that the vehicle is free-wheeling.

By the present construction, the operator will place his or her feet upon the foot rests 29 formed by the extensions of the front axle or shaft 30 upon which the front wheel 11, drum and clutch members rotate.

The present invention eliminates all necessity of the use of the feet for propelling the vehicle, but permits a thorough development of the arms, shoulders, back and muscles of the stomach, which members and muscles are normally not sufficiently exercised by the vehicles now in common usage.

Having thus disclosed the invention, I claim:

1. In a free-wheeling clutch mechanism for propelled vehicles, comprising a driven supporting wheel rotatable on its axle, a drum attached to said wheel, clutch members oscillatable on said drum but adapted to be clutched thereto for moving said members and drum as a unit, and means for oppositely oscillating said members.

2. In a free-wheeling clutch mechanism for propelled vehicles, comprising a driven supporting wheel rotatable on its axle, a drum attached to said wheel, clutch members oscillatable on said drum but adapted to be clutched thereto for rotating said member and drum as a unit, and a manually operated handle connected to said members for oppositely oscillating the same, said clutch members when moved in one direction clutching said drum for driving the wheel, and, when moved in the opposite direction, releasing said drum and moving relative thereto.

3. A free-wheeling vehicle comprising a frame and front and rear supporting wheels, and means for driving one of said supporting wheels for propelling the vehicle, said means comprising a handle adapted to be reciprocated by the occupant, clutch mechanism associated with said driven wheel and including a drum connected to the wheel and a pair of clutching members loose on the drum but each adapted to be clutched therewith when moved in one direction and to move freely on the drum when rotated in the opposite direction, clutching rollers provided in slots formed in each of said members for causing said clutching relation between said members and drum when each of said members is moved in one direction of its travel, and a lever arm connected to each of said members and the handle.

4. A free-wheeling vehicle comprising a frame and front and rear supporting wheels, and means for driving one of said supporting wheels for propelling the vehicle, said means comprising a handle adapted to be reciprocated by the occupant, clutch mechanism associated with said driven wheel and including a drum connected to the wheel and a pair of clutching members loose on the drum but each adapted to be clutched therewith when moved in one direction of its travel and to move freely on the drum when moved in the opposite direction, and an arm connecting each of said members and the handle, said clutches being so arranged as to operate successively whereby the vehicle is continuously propelled during reciprocation of the handle.

5. In a free-wheeling clutch device for propelled vehicles provided with a frame and front and rear supporting wheels, comprising means for driving the front supporting wheel for propelling the vehicle and including a handle adapted to be reciprocated by the occupant, clutch mechanism associated with said front wheel and including a drum connected to the front wheel and a clutching member adapted to move in one direction on said drum and to be clutched thereto when moved in the opposite direction so as to drive the drum and front wheel, and means connecting said handle and clutch member.

6. In a free-wheeling clutch device for propelled vehicles having a frame and front and rear supporting wheels, comprising means for driving one of said wheels for propelling the vehicle and including a handle adapted to be moved backward and forward by the occupant, clutch mechanism associated with said wheel and including a drum connected to the wheel and wedge-shaped slots provided in the inner periphery of said member, rollers in said slots adapted to clutch said member and drum when said member is moved in one direction whereby the member and drum operate as a unit to drive the wheel, and to release said drum when the member is moved in an opposite direction whereby to permit free relative movement therebetween, and means connecting said handle and members whereby to transmit to said member the backward and forward movement of the handle.

7. In a free-wheeling clutch device for propelled vehicles having a frame and front and rear supporting wheels, comprising means for driving one of said wheels for propelling the vehicle and including a handle adapted to be reciprocated by the occupant, clutch mechanism associated with said driven wheel and including a drum connected to the wheel and a pair of clutching members loose on said drum, each adapted to drive said drum when moved in one direction and to freely move on the drum when moved in the opposite direction, and lever arms connecting said handle and members.

FRANCIS J. PLYM.